United States Patent
Kushima et al.

(10) Patent No.: US 10,964,456 B2
(45) Date of Patent: Mar. 30, 2021

(54) GROMMET AND WIRE HARNESS

(71) Applicant: SUMITOMO WIRING SYSTEMS, LTD., Yokkaichi (JP)

(72) Inventors: Takao Kushima, Yokkaichi (JP); Tatsuya Miyazaki, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/303,520

(22) PCT Filed: May 24, 2017

(86) PCT No.: PCT/JP2017/019378
§ 371 (c)(1),
(2) Date: Nov. 20, 2018

(87) PCT Pub. No.: WO2017/208933
PCT Pub. Date: Dec. 7, 2017

(65) Prior Publication Data
US 2019/0244730 A1  Aug. 8, 2019

(30) Foreign Application Priority Data
Jun. 1, 2016 (JP) .............................. JP2016-110008

(51) Int. Cl.
*H01B 17/58* (2006.01)
*H02G 3/22* (2006.01)
(Continued)

(52) U.S. Cl.
CPC ....... *H01B 17/583* (2013.01); *B60R 16/0215* (2013.01); *H01B 17/62* (2013.01);
(Continued)

(58) Field of Classification Search
CPC ............ B60R 16/0207; B60R 16/0215; B60R 16/0222; H01B 17/58; H01B 17/583; H01B 17/62; H02G 3/04; H01R 13/5205
See application file for complete search history.

(56) References Cited

U.S. PATENT DOCUMENTS

| 6,353,185 B1* | 3/2002 | Sakata | ..................... H02G 3/18 16/2.1 |
| 9,620,260 B2* | 4/2017 | Mizuno | ................ B29D 23/005 |

(Continued)

FOREIGN PATENT DOCUMENTS

| JP | 2000-260244 A | 9/2000 |
| JP | 2013-219878 A | 10/2013 |

(Continued)

OTHER PUBLICATIONS

Jun. 20, 2017 Search Report issued in International Patent Application No. PCT/JP2017/019378.

*Primary Examiner* — Steven T Sawyer
*Assistant Examiner* — Paresh H Paghadal
(74) *Attorney, Agent, or Firm* — Oliff PLC

(57) ABSTRACT

A grommet arranged between a pipe and an outer cover that surrounds a braided member connected to the pipe, the grommet including a body with a pass-through space through which a caulking portion of a caulking ring for caulking the braided member to an end portion of the pipe can move in an axial direction.

5 Claims, 5 Drawing Sheets

(51) Int. Cl.
    *B60R 16/02*     (2006.01)
    *H02G 3/04*     (2006.01)
    *H01B 17/62*     (2006.01)
    *H01R 43/20*     (2006.01)
    *H01B 7/00*     (2006.01)
    *H01R 13/52*     (2006.01)

(52) U.S. Cl.
    CPC ............... *H01R 43/20* (2013.01); *H02G 3/04* (2013.01); *H02G 3/22* (2013.01); *B60R 16/0207* (2013.01); *B60R 16/0222* (2013.01); *H01B 7/0045* (2013.01); *H01R 13/5205* (2013.01)

(56) References Cited

U.S. PATENT DOCUMENTS

| | | | | |
|---|---|---|---|---|
| 9,818,504 B2* | 11/2017 | Maeda | ................ | H01B 7/0045 |
| 10,373,737 B2* | 8/2019 | Takahashi | ............ | H01B 7/0045 |
| 2009/0308632 A1* | 12/2009 | Watanabe | ................ | H01B 7/20 |
| | | | | 174/106 R |
| 2013/0299234 A1* | 11/2013 | Izawa | ...................... | H02G 3/06 |
| | | | | 174/70 R |
| 2013/0306364 A1* | 11/2013 | Suzuki | ................. | H05K 9/0088 |
| | | | | 174/394 |
| 2015/0005013 A1* | 1/2015 | Cao | ........................... | G01S 5/02 |
| | | | | 455/456.3 |
| 2015/0008032 A1* | 1/2015 | Nakai | ................... | H02G 3/0691 |
| | | | | 174/650 |
| 2015/0008252 A1* | 1/2015 | Nakai | ...................... | B23K 1/06 |
| | | | | 228/110.1 |
| 2015/0101842 A1* | 4/2015 | Han | .................... | B60R 16/0222 |
| | | | | 174/50.57 |
| 2015/0107894 A1* | 4/2015 | Hayashi | ............. | B60R 16/0215 |
| | | | | 174/72 A |
| 2015/0287497 A1* | 10/2015 | Shiga | .................. | B60R 16/0215 |
| | | | | 174/84 R |
| 2017/0179698 A1* | 6/2017 | Kuroishi | ................. | B60R 16/02 |

FOREIGN PATENT DOCUMENTS

| | | |
|---|---|---|
| JP | 2014-161202 A | 9/2014 |
| JP | 2015-15822 A | 1/2015 |

* cited by examiner

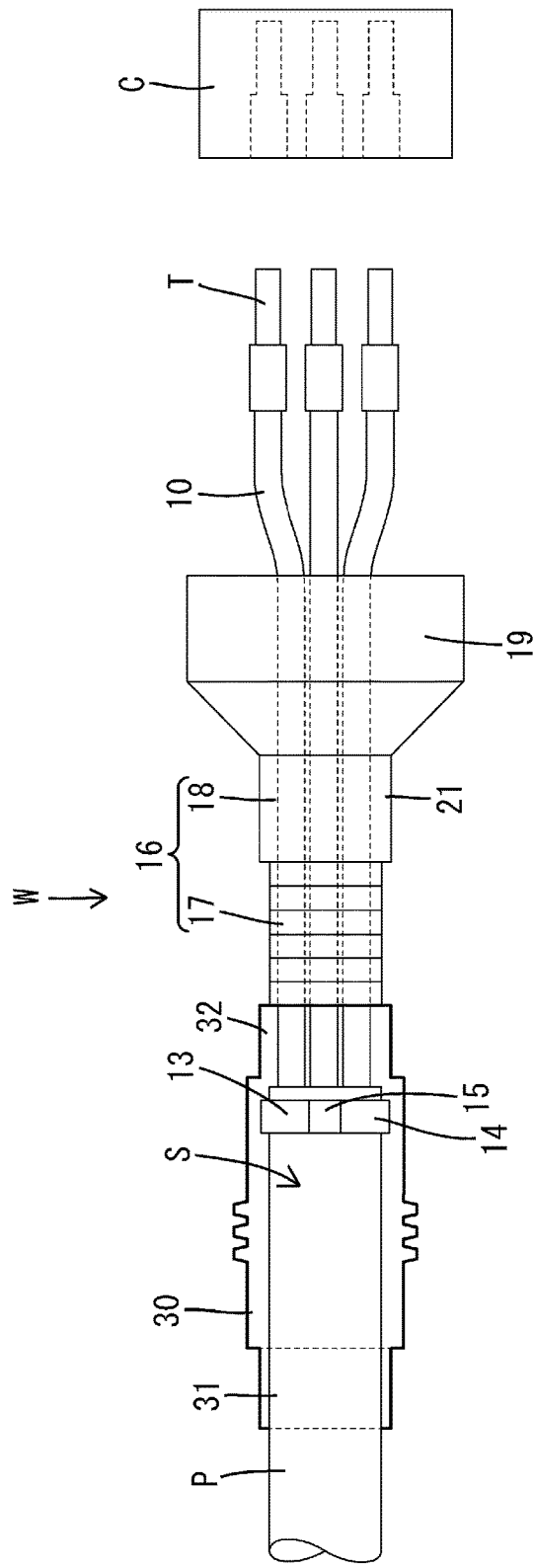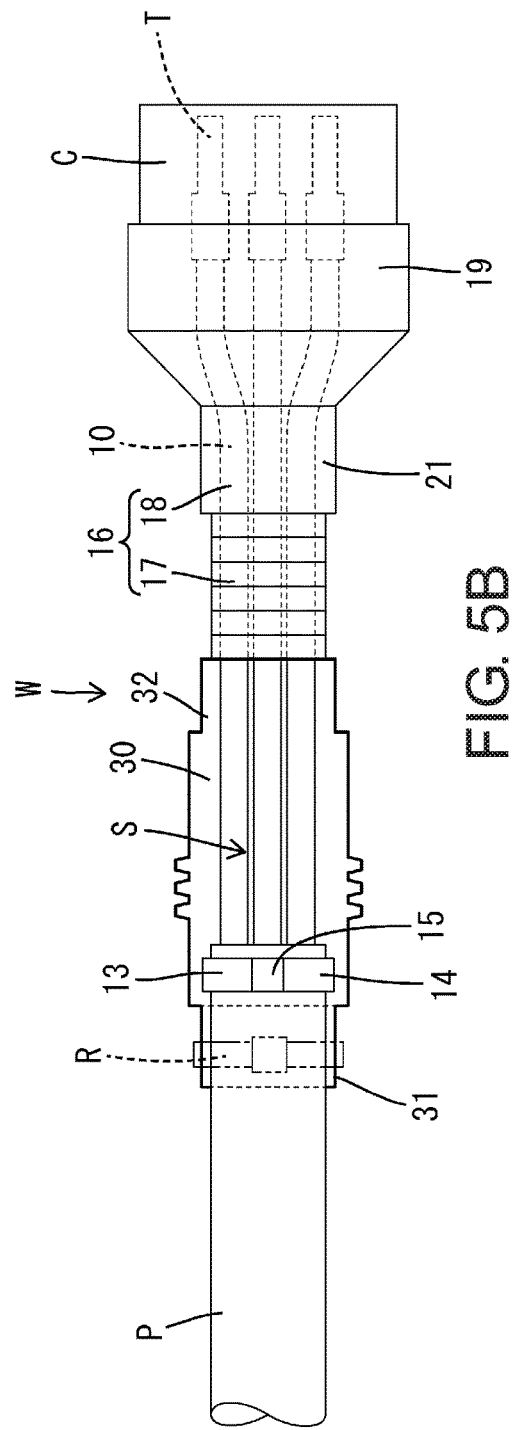
FIG. 5A
FIG. 5B

GROMMET AND WIRE HARNESS

This application is the U.S. National Phase of PCT/JP2017/019378 filed May 24, 2017, which claims priority from JP 2016-110008 filed Jun. 1, 2016, the entire disclosure of which is incorporated herein by reference.

BACKGROUND

The present disclosure relates to a grommet and a wire harness.

Conventionally, a wire harness has been known in which noise shielding is performed by surrounding an electrical wire with a shield member formed by conductively connecting an electrically conductive pipe and a braided member formed by braiding metal strands in the form of a mesh. The end portion of the braided member is placed over the end portion of the pipe and is fixed with a caulking ring.

In general, terminal fittings are included on both end portions of the wire harness. The terminal fittings are connected to a partner side in a state of being exposed or contained in a connector. The connector is waterproofed using an outer cover component such as that described in JP 2000-260244A below, for example.

The space between the pipe and the outer cover component is waterproofed using a grommet such as that described in JP 2015-15822A below, for example. One end side in the axial direction of the grommet is fixed to the end portion of the pipe, and the other end side is fixed to the end portion of the outer cover component.

When the terminal fittings are contained in the connector in this kind of wire harness, the terminal fittings are pulled out from the outer cover component, and the end portion of the outer cover component is folded back to expose the terminal fittings.

SUMMARY

However, with a configuration such as that described above, there is a problem in that it is difficult to connect the connector to both end portions of the wire harness. That is, in the case of attaching a connector to only one end side of the wire harness, the terminal fittings can be pulled out from the outer cover component, but in the case of attaching connectors to both end portions, one end side of the electrical wire is contained in the connector and fixed, and therefore it is difficult to pull out the terminal fittings on the other end side.

Also, the end portion on the pipe side of the grommet covers the outer side of the caulking ring, and therefore movement in the axial direction is restricted by the caulking portion of the caulking ring. For this reason, it is difficult to shift the outer cover component to the pipe side to expose the terminal fittings.

An exemplary aspect of the disclosure provides a grommet and a wire harness according to which connectors can easily be connected to both end portions of a wire harness.

A grommet of the present disclosure is a grommet arranged between a pipe and an outer cover that surrounds a braided member connected to the pipe, including a body with a pass-through space through which a caulking portion of a caulking ring for caulking the braided member to an end portion of the pipe can move in an axial direction.

A wire harness of the present disclosure includes: a pipe; a braided member connected to the pipe; a caulking ring for caulking the braided member to an end portion of the pipe; an outer cover that surrounds the braided member; and the above-described grommet.

According to the present disclosure, the terminal fittings can be exposed by shifting the grommet along with the outer cover in the axial direction, and therefore the connectors can easily be connected to both end portions of the wire harness.

BRIEF DESCRIPTION OF THE DRAWINGS

FIG. 5 shows schematic views showing a method for manufacturing the wire harness, FIG. 5(A) being a schematic view showing a state in which the grommet has been moved to a pipe side, and FIG. 5(B) being a schematic view showing a state in which the grommet has been moved to a connector side.

DETAILED DESCRIPTION OF EMBODIMENTS

Preferred embodiments of the present disclosure will be described below.

A grommet of the present disclosure may include an accordion portion (accordion) in which peak portions (peaks) and valley portions (valleys) are provided alternatingly and continuously in the axial direction. According to this kind of configuration, the grommet itself can easily be bent, and therefore the length of the outer cover component (outer cover) can be made smaller.

Also, with the grommet of the present disclosure, the pass-through space may be provided inside of a protruding portion (protrusion) formed protruding from a main body portion to an outer side in a radial direction, and the width of the protruding portion may be different on the pipe side and on the outer cover component side. With this kind of configuration, the pipe side and the outer cover component side of the grommet can easily be identified, and therefore the grommet can reliably be attached in the correct orientation.

Embodiment

Hereinafter, a specific embodiment of the present disclosure will be described in detail with reference to FIGS. 1 to 5.

Figure 1:
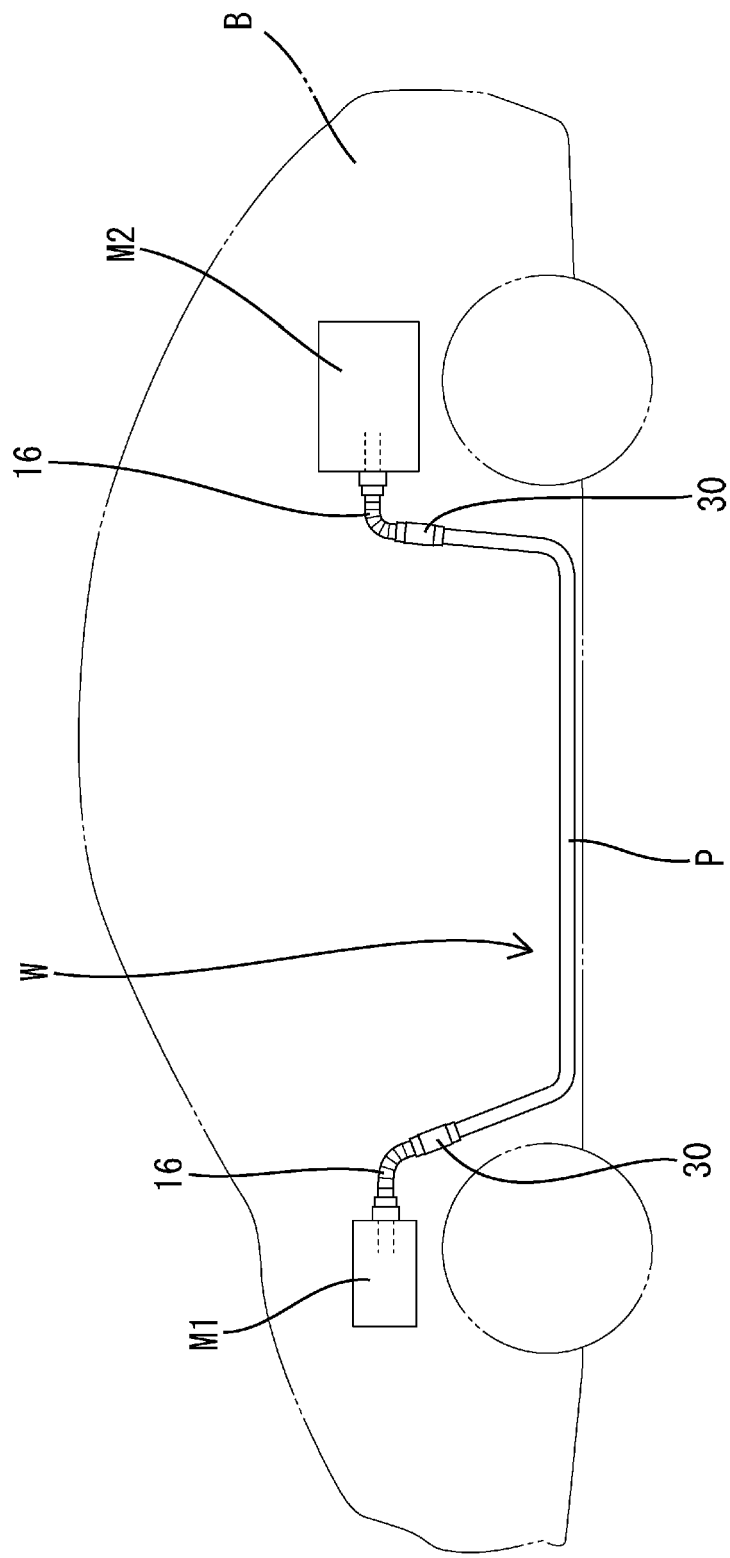
FIG. 1 is a schematic diagram showing a wire harness in the present embodiment, in a state of being attached to a vehicle body.

A wire harness W according to the present embodiment is a pipe harness of a connector type that includes a pipe P into which multiple electrical wires 10 are collectively inserted, connectors C being connected to both end portions in the axial direction of the wire harness W. As shown in FIG. 1, the wire harness W is connected to devices M1 and M2 mounted in a vehicle, one end side being connected to the device M1 provided in the front portion of the vehicle, and the other end side being connected to the device M2 provided in the rear portion of the vehicle. A large portion of the wire harness W (the portion in which the electrical wires 10 are inserted into the pipe P) is routed under the floor of the vehicle body B.

Terminal fittings T contained in the connectors C are conductively connected to both ends of the electrical wires 10 (see FIG. 5). The electrical wires 10 are twisted electrical wires formed by surrounding the outer circumferences of conductors 11 formed by twisting together multiple strands, with insulating coverings 12. The conductors 11 are formed of copper, copper alloy, aluminum, or aluminum alloy.

The pipe P is a shield pipe made of a conductive metal (e.g., made of aluminum or aluminum alloy) and has an elongated shape with a circular cross section.

Braided members H formed by braiding metallic strands in the form of a mesh are electrically connected to both end portions of the pipe P. The braided members H are formed by braiding copper-based metallic strands with tinned surfaces into elongated cylindrical shapes. The electrical wires 10 pulled out from the pipe P are inserted into the braided member H. One end portion of the braided member H is placed on the outer circumferential surface of the pipe P and is fixed through caulking using a caulking ring 13. Also, the other end portion of the braided member H is fixed to the connector C so as to be able to perform electrical conduction.

Figure 4:
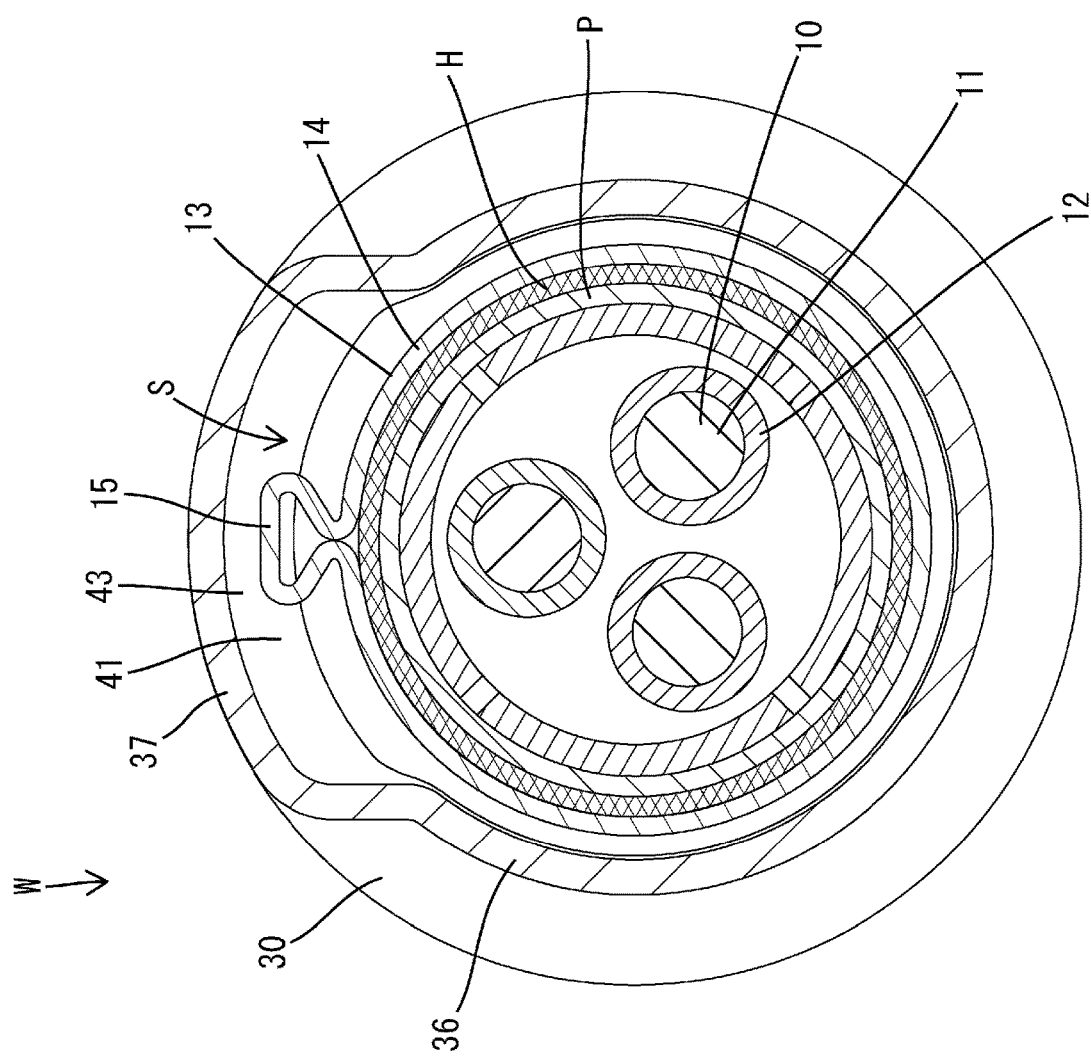
FIG. 4 is a cross-sectional view showing the wire harness, and corresponds to a cross section taken at position A-A in FIG. 3.

The caulking ring 13 is a known caulking ring, and as shown in FIG. 4, the caulking ring 13 includes a band portion 14 with a ring shape overall and a caulking portion 15 in which a portion in the circumferential direction of the band portion 14 is formed protruding outward in the radial direction. Due to the root portions of the caulking portion 15 being brought close together, the band portion 14 can transition to a contracted-diameter state and the caulking ring 13 can be tightened.

The portions of the electrical wires 10 that are guided out from the pipe P are surrounded with the flexible outer cover component 16. The outer cover component 16 includes a corrugated tube 17 that surrounds a large portion of the braided member H and a connector cover member 18 that covers the connector C. With the outer cover member 16, the portions of the electrical wires 10 arranged between the pipe P and the connectors C are protected and waterproofed.

The corrugated tube 17 is made of synthetic resin, is formed into an accordion shape with peak portions and valley portions repeated over the entire length, and has a favorable flexibility.

The connector cover member 18 is made of rubber, which is an elastic material, one end side thereof being set as a first cylinder portion 19 that can come into close contact with the outer circumferential surface of the connector C, and another end side thereof being set as a second cylinder portion 21 that can fit over the end portion of the corrugated tube 17 (see FIG. 5). The second cylinder portion 21 of the corrugated cover member 18 is placed on the outer circumferential surface of the end portion of the corrugated tube 17 and is fixed with a resin band or the like (not shown).

The grommet 30 is arranged between the pipe P and the outer cover component 16. The grommet 30 is made of rubber, which is an elastic material, and has an overall cylindrical shape, one end side thereof being set as a first end portion 31 connected to the end portion of the pipe P and the other end side thereof being set at a second end portion 32 connected to the end portion of the outer cover component 16. The first end portion 31 and the second end portion 32 have approximately circular cross sections that can be fit over the end portion of the pipe P and the end portion of the outer cover component 16 respectively. Note that the thickness (dimension in the radial direction) of the second end portion 32 is larger than the thickness of the first end portion 31.

Figure 3:
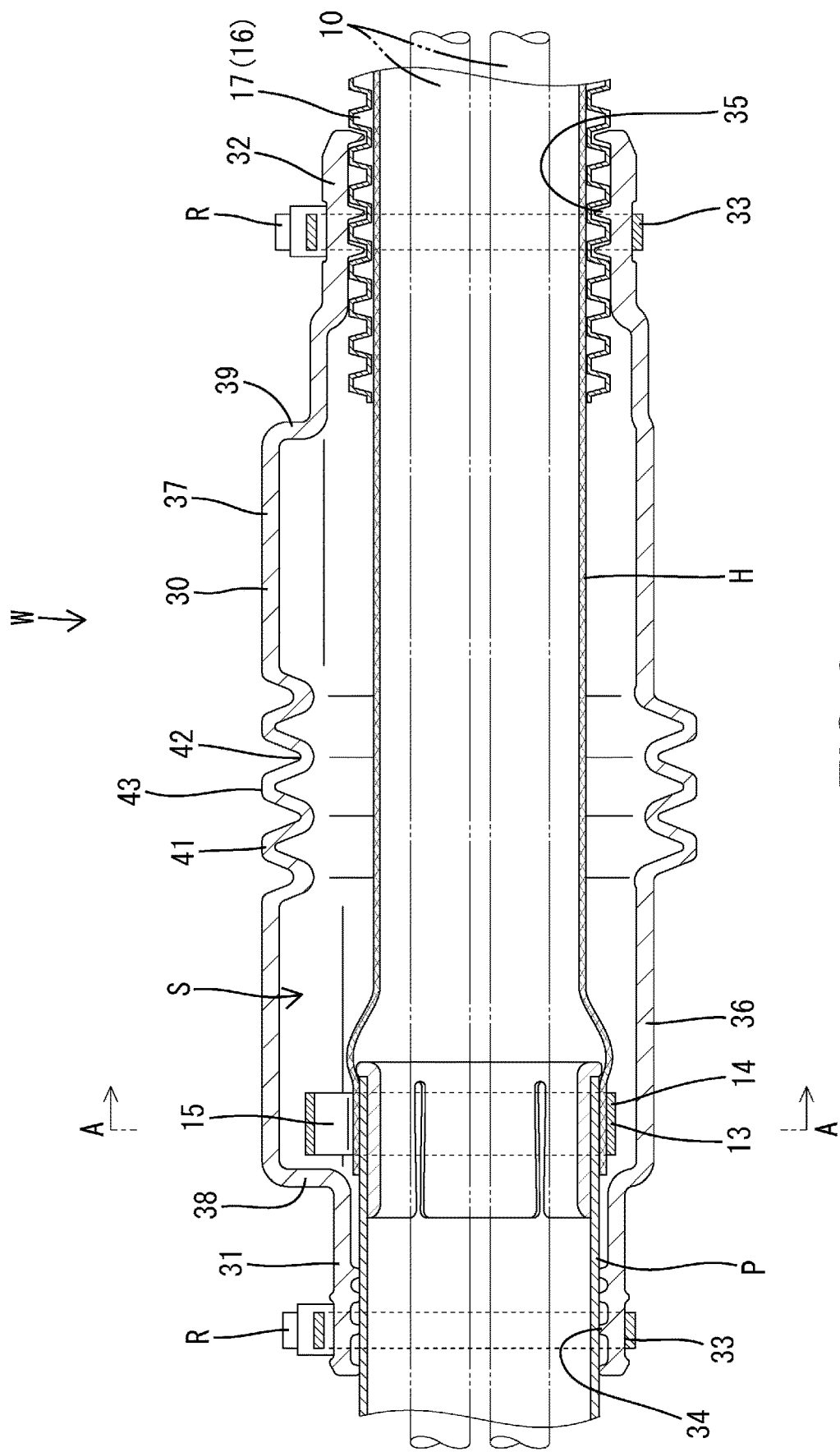
FIG. 3 is a partially enlarged cross-sectional view showing an attachment portion of the grommet in the wire harness.

As shown in FIG. 3, positioning portions 33 by which arbitrary wrapping members (resin bands, etc.) R are positioned are provided on the outer circumferential surfaces of the first end portion 31 and the second end portion 32. The positioning portions 33 have groove shapes that are formed by being recessed over the entire circumference on the first end portion 31 and the second end portion 32.

A first lip portion 34 and a second lip portion 35 that can come into contact with the outer circumferential surfaces of the pipe P and the outer cover component 16 are provided in a protruding manner on the inner circumferential surfaces of the first end portion 31 and the second end portion 32. The first lip portion 34 and the second lip portion 35 are formed continuously over the entire circumference on the inner circumferential surfaces of the first end portion 31 and the second end portion 32.

Multiple (in the present embodiment, four) first lip portions 34 are provided. The intervals between adjacent first lip portions 34 increase in size toward the end side. The first lip portions 34 have shapes whose leading ends are rounder than those of the second lip portions 35, and can come into close contact with the outer circumferential surface of the pipe P.

Multiple (in the present embodiment, three) second lip portions 35 are provided. The second lip portions 35 can be inserted into valleys 42 of the corrugated tube 17 included in the outer cover component 16.

As shown in FIG. 3, the grommet 30 is provided with a pass-through space S through which the caulking portion 15 of the caulking ring 13 can be passed in the axial direction. The pass-through space S has a dimension in the axial direction with leeway (a dimension several times larger) with respect to the width (dimension in the axial direction of the caulking ring 13) of the caulking portion 15. Accordingly, the caulking portion 15 can move in the pass-through space S in the axial direction until the grommet 30 is fixed to the pipe P.

As shown in FIG. 4, the pass-through space S is the internal space of a protruding portion 37 that protrudes outward in the radial direction from the main body portion 36 having a shape that conforms to the outer shape of the pipe P. The protruding portion 37 has a form in which a portion in the circumferential direction of the main body portion 36 partially protrudes outward.

The inner diameter of the grommet 30 at the forming location of the protruding portion 37 is made larger than the outer diameter of the caulking ring 13 including the caulking portion 15. Also, the pass-through space S has a width with leeway (a width that is several times larger) with respect to the width (dimension in the circumferential direction of the caulking ring 13) of the caulking portion 15.

The protruding portion 37 is provided at an intermediate portion (portion between the first end portion 31 and the second end portion 32) in the axial direction of the grommet 30. A dimension in the axial direction of the protruding portion 37 is made larger than the dimensions in the axial direction of the first end portion 31 and the second end portion 32.

Both end portions in the axial direction of the protruding portion 37 are set as a first stopper portion 38 and a second stopper portion 39 that limit the movement in the axial direction of the caulking portion 15 to the protruding portion 37. The first stopper portion 38 and the second stopper portion 39 have a wall shape that stands approximately upright from the main body portion 36 outward in the radial direction. Note that the rising dimension of the first stopper portion 38 is made slightly larger than the rising dimension of the second stopper portion 39.

Figure 2:
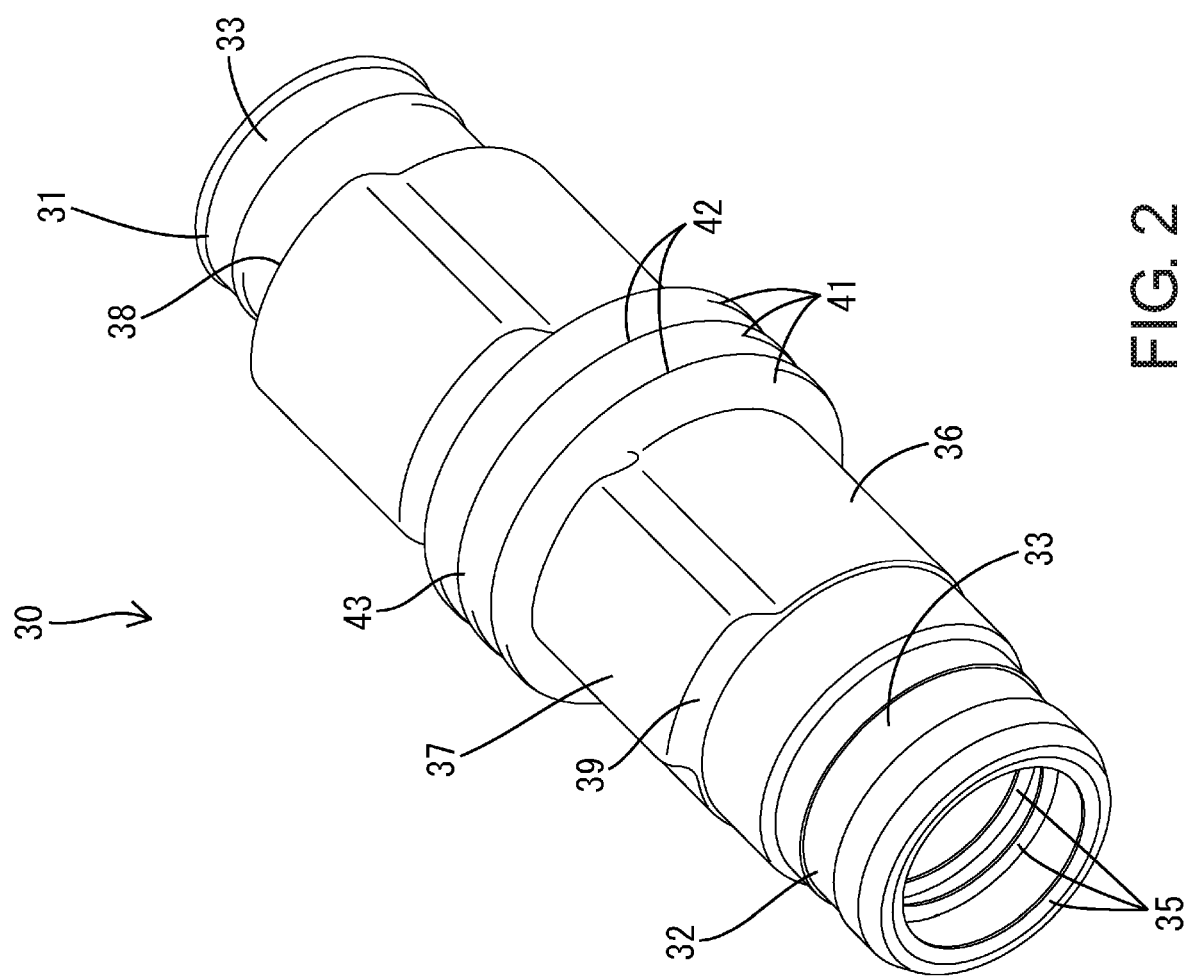
FIG. 2 is a perspective view showing a grommet.

As shown in FIG. 2, the width (dimension in the circumferential direction of the grommet 30) of the protruding portion 37 is different on the first end portion 31 side and the second end portion 32 side. In the present embodiment, the width of the first end portion 31 side is made larger than the width of the second end portion 32 side. The width of the protruding portion 37 is different on both sides of the later-described accordion portion 43. Note that the width of the protruding portion 37 is made smaller than the outer shape dimension of the main body portion 36.

The grommet 30 includes the accordion portion 43, in which peak portions 41 and the valley portions 42 are provided alternatingly and continuously in the axial direction. The accordion portion 43 is provided at an intermediate portion (intermediate portion of the protruding portion 37) in the axial direction of the grommet 30. The protruding end surfaces of the peak portions 41 of the accordion portion 43 are arranged at almost the same position as the protruding end portion of the protruding portion 37 and do not protrude outward in the radial direction with respect to the protruding portion 37. The valley portions 42 of the accordion portion 43 are located slightly on the outside in the radial direction with respect to the inner circumferential surface of the main body portion 36 and do not protrude to the inside of the grommet 30. In the portion of the accordion portion 43 formed at a site other than the protruding portion 37 as well, the valley portions 42 do not protrude inside with respect to the inner circumferential surface of the main body portion 36.

Next, an example of a method for manufacturing the wire harness W in the present embodiment will be described.

First, the braided member H is connected to the end portion of the pipe P and the electrical wire 10 is inserted into the pipe P and the braided member H. The end portion of the braided member H is placed on the outer circumferential surface of the pipe P, the caulking ring 13 is caulked to the outer circumference of the braided member H, and the caulking ring 13 is fixed to the pipe P.

Next, the grommet 30 and the outer cover component 16 are connected to the end portion of the pipe P. The grommet 30 and the outer cover component 16 are integrally attached in advance using a wrapping member R such as a resin band. Also, a wrapping member R is wrapped with a small amount of slack onto the first end portion 31 of the grommet 30. The attached grommet 30 and the outer cover component 16 are passed through from the terminal fitting T side and the first end portion 31 of the grommet 30 is placed over the end portion of the pipe P. At this time, the caulking portion 15 of the caulking ring 13 is contained inside of the protruding portion 37 of the grommet 30.

Next, the connector C is connected to the end portion of the wire harness W. As shown in FIG. 5(A), the grommet 30 and the outer cover component 16 are shifted to the pipe P side to sufficiently expose the terminal fittings T. At this time, the caulking portion 15 of the caulking ring 13 moves through the pass-through space S to the second end portion 32 side. The caulking portion 15 moves in the axial direction while the peak portions 41 of the accordion portion 43 located in the protruding portion 37 are elastically deformed. When the caulking portion 15 reaches the terminal end (end on the second end portion 32 side) of the pass-through space S, a large portion of the grommet 30 covers the pipe P, the entirety of the outer cover component 16 shifts toward the pipe P, and the exposure length of the terminal portion of the electrical wires 10 is sufficient. When the terminal fittings T exposed from the outer cover component 16 are contained by being inserted into the connectors C in sequence, the connectors C are connected to the end portions of the wire harness W.

Next, the grommet 30 and the outer cover component 16 are placed over the connector C by being shifted toward the connector C. As shown in FIG. 5(B), when the grommet 30 and the outer cover component 16 is shifted toward the connector C, the caulking portion 15 of the caulking ring 13 moves through the pass-through space S toward the first end portion 31. When the caulking portion 15 reaches the starting end (end on the first end portion 31 side) of the pass-through space S, the outer cover component 16 surrounds the entire length of the braided member H, and the first cylinder portion 19 of the connector cover member 18 reaches the connector C. At this time, the position of the end portion of the grommet 30 may be marked on the outer circumferential surface of the pipe P and the grommet 30 may be pulled back to the mark. The first cylinder portion 19 of the connector cover member 18 is placed on the outer circumferential surface of the connector C, and the wrapping member R wrapped onto the first end portion 31 of the grommet 30 is tightened, whereby the grommet 30 and the outer cover component 16 are fixed to the correct portion.

After the task of connecting the above-described connector C is performed in sequence for both end portions of the wire harness W, the pipe P is bent into a predetermined shape.

Accordingly, the task of manufacturing the wire harness W is complete.

Next, the actions and effects of the embodiment configured as described above will be described.

The grommet 30 of the present embodiment is a grommet 30 arranged between the pipe P and the outer cover component 16 that surrounds the braided member H connected to the pipe P, and includes the pass-through space S through which the caulking portion 15 of the caulking ring 13 that caulks the braided member H to the end portion of the pipe P can move in the axial direction. With this configuration, the grommet 30 and the outer cover component 16 can be shifted in the axial direction to expose the terminal fittings T, and therefore the terminal fittings T can be easily contained in the connector C without adding unnecessary force to the electrically wires 10 and the terminal fittings T, and thus the connector C can easily be connected to both end portions of the wire harness W.

Also, the accordion portion 43 in which the peak portions 41 and the valley portions 42 are provided alternatingly and continuously in the axial direction is included. With this configuration, the grommet 30 itself can easily be bent, and therefore the length of the corrugated tube 17 can be made smaller.

Also, the pass-through space S is provided inside of the protruding portion 37 provided protruding to the outside in the radial direction from the main body portion 36, and the width of the protruding portion 37 is different on the pipe P side and the corrugated tube 17 side. With this configuration, the pipe P side and the corrugated tube 17 side of the grommet 30 can easily be identified, and therefore the grommet 30 can be reliably attached in the correct orientation.

Other Embodiments

The present disclosure is not limited to the embodiment described using the above description and drawings, and for example, the following embodiments are included in the technical scope of the present disclosure.

(1) In the above-described embodiment, the protruding portion 37 is provided in a form in which a portion in the circumferential direction of the main body portion 36 partially protrudes to the outside, but there is no limitation to this, and the protruding portion may be provided in a form in which the entirety of the main body portion protrudes to the outside.

(2) In the above-described embodiment, the outer cover component 16 is formed by attaching a separate corrugated tube 17 and connector cover member 18, but there is no limitation to this, and for example, the corrugated tube and the connector cover member may be one component, that is, the cover portion that covers the connector is provided on one end portion of a cylindrical portion having an accordion shape.

(3) In the above-described embodiment, the grommet 30 includes the accordion portion 43, but the grommet need not include the accordion portion.

(4) In the above-described embodiment, the accordion portion 43 is provided at an intermediate portion of the protruding portion 37, but there is no limitation to this, and the accordion portion may be provided at a position shifted in the axial direction with respect to the protruding portion.

(5) In the above-described embodiment, the width of the protruding portion 37 is different on the first end portion 31 side and the second end portion 32 side, but there is no limitation to this, and the width of the protruding portion may be constant over the entirety of the axial direction.

The invention claimed is:

1. A grommet arranged between a pipe and an outer cover that surrounds a braided member connected to the pipe, the grommet comprising
 a body with a first end portion, a second end portion and a protruding portion between the first end portion and the second end portion,
 wherein the protruding portion is provided with a pass-through space through which a caulking portion of a caulking ring for caulking the braided member to an end portion of the pipe can move in an axial direction,
 wherein a radial dimension of both the first end portion and the second end portion is smaller than a radial dimension of the caulking portion, and a radial dimension of the pass-through space of the protruding portion along an entire axial length between a first end and a second end of the protruding portion is greater than the radial dimension of the caulking portion,
 wherein an axial dimension of the protruding portion is larger than an axial dimension of the first end portion and the second end portion,
 wherein the protruding portion includes an accordion in which peaks and valleys are provided alternatingly and continuously in the axial direction,
 wherein the accordion is provided only at an intermediate portion halfway between the first end and the second end of the protruding portion and not along the entire axial length of the protruding portion between the first end and the second end.

2. The grommet according to claim 1, wherein the pass-through space is provided inside of a protrusion formed protruding from a main body portion of the body to an outer side in a radial direction, and a width of the protrusion is different on a pipe side and on an outer cover component side.

3. A wire harness comprising:
 the pipe;
 the braided member connected to the pipe;
 the caulking ring for caulking the braided member to the end portion of the pipe;
 the outer cover that surrounds the braided member; and
 the grommet according to claim 1.

4. The wire harness according to claim 1, wherein the caulking ring is located axially between the accordion and the end of the body.

5. The wire harness according to claim 1, wherein the first end and the second end of the protruding portion limit movement of the caulking portion in the axial direction.

* * * * *